(12) United States Patent
Eyal

(10) Patent No.: US 7,722,746 B1
(45) Date of Patent: May 25, 2010

(54) SELF-CLEANING CHLORINE GENERATOR WITH PH CONTROL

(75) Inventor: Omer C. Eyal, Altamonte Springs, FL (US)

(73) Assignee: Maytal Tech, LLC, Altamonte Springs, FL (US)

( * ) Notice: Subject to any disclaimer, the term of this patent is extended or adjusted under 35 U.S.C. 154(b) by 256 days.

(21) Appl. No.: 12/111,564

(22) Filed: Apr. 29, 2008

Related U.S. Application Data

(62) Division of application No. 10/711,419, filed on Sep. 17, 2004, now Pat. No. 7,507,323.

(51) Int. Cl.
*C25B 15/02* (2006.01)
*C25B 1/26* (2006.01)

(52) U.S. Cl. .................. 204/228.6; 204/228.1; 205/620; 205/743; 205/744; 205/759; 134/3; 210/743; 210/754

(58) Field of Classification Search .................. 205/620, 205/743, 744, 759; 204/228.1, 228.6; 134/3; 210/743, 754
See application file for complete search history.

(56) References Cited

U.S. PATENT DOCUMENTS

| | | | |
|---|---|---|---|
| 4,255,246 A | 3/1981 | Davis et al. |
| 4,381,240 A | 4/1983 | Russell |
| 4,500,404 A | 2/1985 | Tucker |
| 4,599,159 A | 7/1986 | Hilbig |
| 4,724,059 A | 2/1988 | Collier |
| 4,793,909 A | 12/1988 | Maddock |
| 4,808,290 A | 2/1989 | Hilbig |
| 4,900,418 A | 2/1990 | Maddock |
| 5,013,415 A | 5/1991 | Hudson |
| 5,018,890 A | 5/1991 | May |
| 5,034,110 A | 7/1991 | Glore et al. |
| 5,205,994 A | 4/1993 | Sawamoto et al. |
| 5,279,748 A | 1/1994 | Hackett |
| 5,320,748 A | 6/1994 | Dupuis |
| 5,326,443 A | 7/1994 | Hilbig |
| 5,340,458 A | 8/1994 | Koizumi |
| 5,362,368 A | 11/1994 | Lynn et al. |
| 5,567,283 A | 10/1996 | Lynn et al. |
| 5,849,199 A | 12/1998 | Jack |
| 6,007,693 A | 12/1999 | Silveri |
| 6,149,780 A | 11/2000 | Miyake |
| 6,274,009 B1 | 8/2001 | Krafton et al. |

(Continued)

*Primary Examiner*—Harry D. Wilkins, III
*Assistant Examiner*—Nicholas A. Smith
(74) *Attorney, Agent, or Firm*—Ronald E. Smith; Smith & Hopen, P.A.

(57) ABSTRACT

A water treatment system includes a circulation pump and an electrolytic chamber in fluid communication with a main body of water. Electrolytic plates within the electrolytic chamber generate chlorine. When mineral deposits foul the electrolytic plates, water is isolated within the electrolytic chamber and a minimal amount of a pH-reducing agent is added to the electrolytic chamber to remove the mineral deposits. In a first embodiment, the pH-reducing agent is admitted on a periodic timed basis. In a second embodiment, the pH-reducing agent is added when the pH of the main body of water falls below a predetermined threshold. In both embodiments, cleaning is accomplished by adding the pH-reducing agent when the circulation pump is not operating so that the acid dwells within the electrolytic chamber for a sufficient amount of time. Activation of the circulation pump causes the pH-reducing agent to enter the main body of water.

8 Claims, 3 Drawing Sheets

U.S. PATENT DOCUMENTS 6,551,518 B2 4/2003 Gargas
2001/0004962 A1* 6/2001 Hirota et al. ............. 204/228.1
2003/0222030 A1 12/2003 Woytowich et al.

* cited by examiner

US 7,722,746 B1

SELF-CLEANING CHLORINE GENERATOR WITH PH CONTROL

CROSS-REFERENCE TO RELATED DISCLOSURE

This disclosure is a divisional application claiming the benefit of the filing date of U.S. patent application entitled: "Self-Cleaning Chlorine Generator with pH Control," filed by the same inventor on Sep. 17, 2004, bearing Ser. No. 10/711,419, now U.S. Pat. No. 7,507,323.

FIELD OF THE INVENTION

This invention relates to electrolytic chlorine generators. More particularly, it relates to means for introducing a pH-reducing agent into an electrolytic chamber for dissolving mineral deposits from electrolytic cells.

DESCRIPTION OF THE PRIOR ART

Electrolytic chlorine generators include electrolytic cells having plates that are coated on one side or both sides, depending upon the type of cell, with a platinum group metal (PGM) such as ruthenium, or similar coating.

The operation of an electrolytic chlorine generator has the side effect of gradually increasing the pH level of a body of water undergoing such chlorination. If the pH is too high, it can adversely affect the water quality and the effectiveness of the chlorine generated by the generator. Accordingly, the pH level of a swimming pool, spa, fountain, well, or other body of water equipped with an electrolytic chlorine generator and a circulating pump must be lowered periodically.

A pool, spa, fountain, well owner, or the like is required to periodically perform a test of the water to determine its pH level, and to add muriatic acid or other suitable pH-reducing agent to reduce the level if it is too high. The acid has a pH of about 0.1 and thus is extremely dangerous to handle and causes severe burns if it contacts the skin, open wounds, or the eyes.

There is therefore a need for an improved method for adjusting the pH of water in circulating water systems equipped with an electrolytic chlorine generator.

Moreover, the electrolytic cells that generate the chlorine are subject to degradation due to the formation of mineral deposits, typically calcium, thereon. The mineral deposits must therefore be removed as needed.

One prior art technique for cleaning the cells requires manually removing them from the chlorination system and soaking them in acid. In a typical swimming pool system, such manual cleaning is required about every two weeks. Such manual cleaning is burdensome, risky, and has the disadvantage of using excessive amounts of acid. The electrolytic cell or block of plates is removed from the circulation line and soaked for approximately five (5) minutes in a bucket containing a diluted hydrochloric acid solution of about one (1) part acid to five (5) parts water.

The frequency of manual cleaning may be reduced to quarterly if the polarity of the electric charge transmitted to the electrolytic plates is periodically reversed. Chlorine is produced on the anode plate or the anode side of a bipolar cell. Thus, in an ideal electrolytic cell, a PGM is applied only to the anode plate or the anode side of a bipolar cell. The cathode plate, or the cathode side of a bipolar cell, is not coated because such plate or side is merely needed to complete the electrical circuit.

However, in a practical electrolytic cell, the cathode plate and the cathode side of plates in a bipolar cell must also be coated because the polarity of the anode and cathode must be reversed periodically to clean the plates. More particularly, a system that requires polarity reversal is typically operated half the time in one polarity and half the time in the opposite polarity. A system that does not rely on reverse-polarity operation would thus reduce the amount of PGM-coated plates by half.

Unfortunately, reversing polarity has detrimental effects on the electrolytic plates. A PGM coating holds up well during anode operation, but steadily deteriorates during cathode operation. Thus it is desirable to operate PGM-coated plates only on the anode side and the uncoated plates only on the cathode side. Reversal of polarity results in cathode operation of the PGM coated side. Accordingly, cleaning of deposits from the plates by reversing the polarity of the anode and cathode should be minimized if not completely avoided. However, most electrolytic chlorine generators rely on polarity reversal as the primary means of removing calcium deposits from the plates.

Moreover, polarity reversal causes the plates to repeatedly charge up, and such charging up wears out the PGM coating at a much faster rate than steady state operation.

More specifically, charging the plates causes the plates to absorb a minor shock that wears out the PGM coating. This shock can be minimized by a gradual discharging of the plates, followed by a gradual re-charging at an opposite polarity. This method of reversing polarity is called the "soft start" method and reduces but does not eliminate the wear on the plates. Thus it is beneficial to eliminate or to at least reduce the number of times that the system is subjected to a reverse polarity, and to use the soft start method when a polarity reversal is required.

However, even with routine reversal of polarity, the electrolytic cells will still collect calcium deposits over time. At least some of the calcium deposits will eventually flake off and foul the body of water. In a swimming pool or spa, this unsightly debris is eventually suctioned by a pool cleaner or pool drain into a pool filter where the calcium is collected.

A need therefore exists for a method that will clean calcium deposits from electrolytic plates before the calcium flakes off from the plates.

Hardened calcium deposits do not easily dissolve back onto the body of water so they remain on the filter until it is removed from the system and cleaned. The calcium content of the water thus drops over time and requires replenishment because a swimming pool having low-calcium water will aggressively attack various pool walls and equipment.

Thus there is a need for an electrolytic chlorine generator that cleans calcium deposits from electrolytic plates but which does not result in removal of calcium from the body of water, and which therefore does not require that calcium be added periodically to a body of water.

Electrolytic chlorinators operate best when the salt content of the main body of water is between 2800 to 5000 parts per million. This high salinity adversely affects some swimmers if the main body of water is a swimming pool. Such high salinity may disqualify an electrolytic chlorinator from use where the main body of water is a fountain because salt may leave white marks on fixtures after a fixture has been splashed and the splashed water has evaporated.

A need therefore exists for an electrolytic chlorinator that operates well in a low salt environment.

It is known that the salt content of the water may be reduced if the surface area of the PGM-coated plates in the electrolytic cell is exponentially increased and the plates are spaced closer together to compensate for the lower conductivity of the water. Unfortunately, plates that are spaced close to one another become fouled with mineral deposits at a substantially faster rate than more widely spaced plates. This effect may be countered to some extent by increasing the flow rate of water past the plates and by reversing the polarity of the plates on a more frequent basis. Since maintaining higher flow rates often requires increased energy and equipment expenditures and the increased use of polarity reversal wastes the PGM, most systems forego the closer plate spacing and continue to require high salinity.

Thus there is a need for an electrolytic chlorinator that operates well at lower salt levels without requiring a higher flow rate and without increasing the consumption of PGM.

A general need exists for an improved method for cleaning calcium and other mineral deposits from the electrolytic cells of an electrolytic chlorine generator. The improved method would not have a detrimental effect on the electrolytic plates and would eliminate the need for biweekly or quarterly manual cleaning of the cells.

The improved method would also eliminate or at least substantially reduce the need for cleaning the plates by subjecting them to polarity reversal. Such an improved method would thus lower the requisite number of PGM-coated plates.

Peristaltic pumps for infusing an acidic agent into the line as the circulation pump is operating are in common use in large commercial fountain and swimming pool installations. However, such pumps are expensive and are subject to wearing out. There are also systems for infusing chemicals into the lines that harness the suction created by the circulation pump to pull the chemicals into the pump. This method has the drawback of causing aggressive chemicals such as hydrochloric acid to attack the circulating pump, filters, heaters, and any other equipment that might be present in the system. Since the pump is the first piece on the slab, it is affected the most by such aggressive agents.

Thus there is a need for an infusing means that infuses aggressive chemicals downstream of the pump and other pieces of equipment that are not designed to resist aggressive chemicals.

There is also a need for an infusion system that eliminates the need for a pump that is dedicated to infusion.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved means for adjusting the pH of water having chlorine added thereto by an electrolytic chlorine generator and for cleaning calcium or other mineral deposits from the electrolytic cells of such generator is now met by a new, useful, and non-obvious invention.

The inventive structure is a novel chlorine generator that uses the natural propensity of electrolytic chlorination to increase pH levels over time as a means to enable the cleansing of an electrolytic chamber by introducing a predetermined volume of a pH-reducing agent into the electrolytic chamber so that mineral deposits are dissolved from cell plates during a time period that a circulation system is not operating, e.g., during an overnight time period. Advantageously, the novel system controls pH levels in the body of water as well. After the circulation pump is turned off so that water is not circulating through the system, a minimal amount of water is automatically isolated within an electrolytic cell and a predetermined minimal volume of hydrochloric acid or other suitable pH-reducing agent is automatically introduced into the electrolytic cell using a gravity feed mechanism or pump. The pH level in the isolated cell is significantly reduced because the finite body of water affected by the pH-reducing agent is relatively small. The low pH solution dwells within the electrolytic cell overnight or for the duration of the cycle downtime if the system is not circulating at some other time of day. The lowered pH solution has a small but consistent and persistent effect on calcium build-up on the plates of the electrolytic cell, gradually dissolving the calcium and having a limited, controlled effect on the pH and alkalinity levels in the main body of water.

A very small amount of pH-reducing agent is required to automatically clean the cell because the volume of water in the cell is minimized. Less water enables the use of less pH-reducing chemical. Accordingly, the quantity of pH-reducing agent is minimized by isolating the smallest possible amount of water within and around the electrolytic cell. The volume of water isolated within and around the cell determines the amount of acid necessary to effectively reduce the pH levels and thereby clean the cell.

The novel chlorine generator of this disclosure introduces a predetermined volume of hydrochloric acid, commercially known as muriatic acid, or an alternative pH-reducing agent into an electrolytic chamber to dissolve mineral deposits from cells overnight.

In a first embodiment, a predetermined volume of a pH-reducing agent such as muriatic acid is introduced into the electrolytic chamber on a predetermined, periodic schedule.

In a second embodiment, the pH-reducing agent is added in response to monitored levels of pH in the main body of water.

In both embodiments, the pH-reducing agent is introduced into the electrolytic chamber when the circulating pump is not operating. The pH-reducing agent resident in the electrolytic chamber, after having been used to clean mineral deposits from the electrolytic cells over an extended period of time, is flushed into the main body of water, thereby reducing the pH level in the main body of water, when the water circulation pump is re-activated.

Significantly, the volume of water within the electrolytic chamber is small. Thus, only a small amount of pH-reducing agent is required to substantially lower the pH of the water in the electrolytic chamber and to thereby cause removal of calcium deposits. Thus, when the circulation pump is re-started, only a small amount of pH-reduced water is introduced into the swimming pool or other body of water under treatment. This prevents abrupt drops in the pH level of the body of water as a whole. Advantageously, the small injections of reduced pH water into the body of water serve to maintain the pH within the desirable range.

Accordingly, the electrolytic cells or plates are not removed from the electrolytic chamber prior to their cleaning by the muriatic acid. This advantageously saves the time expended in manually removing the electrolytic plates, cleaning them, and re-installing them. It also avoids wasteful use of the pH-reducing agent.

The first embodiment of the self-cleaning chlorine generator includes an electrolytic chamber having an inlet and an outlet. A circulation pump is adapted to pump water from a main body of water such as a swimming pool, spa, fountain, well, or the like through the electrolytic chamber. An electrolytic cell disposed within the electrolytic chamber has a plurality of electrolytic plates. A reservoir of acid is disposed in selective, valved fluid communication with the electrolytic chamber. Specifically, a normally closed valve prevents the acid from flowing into the electrolytic chamber. A valve actuator connected to the normally closed valve is adapted to open and close the normally closed valve.

In the first embodiment, a control means is electrically connected to the valve actuator and a timer means is electrically connected to the control means. The timer means is adapted to send an "open" signal to the control means at predetermined times. The "open" signal causes the control means to actuate the valve actuator so that the normally closed valve is opened for a predetermined amount of time. The timer means is also adapted to send a "close" signal to the control means at predetermined times. The "close" signal causes the control means to de-actuate the valve actuator so that the normally closed valve is closed upon expiration of the predetermined amount of time. The circulation pump is in an inactivated state when the timer means sends the "open" and "closed" signals to the control means so that acid admitted into the electrolytic chamber dwells within the electrolytic chamber until the circulation pump is activated. Acid in the electrolytic chamber cleans mineral deposits from the anode and cathode when the circulation pump is not operating. The acid in the electrolytic chamber is introduced into the swimming pool when the circulation pump is reactivated.

In the second embodiment, a pH sensor disposed in the main body of water is adapted to generate and send an "open" signal to the control means when the sensor detects that the pH of the water is below a predetermined threshold. The "open" signal causes the control means to actuate the valve actuator so that the normally closed valve is opened for a predetermined amount of time. The pH sensor means is also adapted to generate and send a "close" signal to the control means upon expiration of the predetermined amount of time. The "close" signal causes the control means to de-actuate the valve actuator so that the normally closed valve is closed upon expiration of the predetermined amount of time. The circulation pump is in a deactivated state when the pH sensor means sends the "open" and "closed" signals to the control means so that acid admitted into the electrolytic chamber dwells within the electrolytic chamber until the circulation pump is activated. The acid in the electrolytic chamber cleans mineral deposits from the anode and cathode when the circulation pump is not operating. The acid in the electrolytic chamber is introduced into the main body of water when the circulation pump is activated.

In the first two embodiments, the electrolytic chamber is vertically oriented and a check valve positioned below the electrolytic chamber is employed to prevent water from flowing from the chamber to the main body of water when the circulation pump is off. In a third embodiment, the electrolytic chamber is horizontally disposed and is positioned at a lower elevation than its inlet and outlet so that water therewithin, when the circulation pump is not running, is trapped and covers the electrolytic plates in the chamber. This eliminates the need for a check valve.

In all embodiments, the pH-reducing agent is preferably muriatic acid and the actuator means is preferably a solenoid valve. Any other suitable pH-reducing agent and any other actuator means is within the scope of this invention.

BRIEF DESCRIPTION OF THE DRAWINGS

For a fuller understanding of the nature and objects of the invention, reference should be made to the following detailed description, taken in connection with the accompanying drawings, in which:

FIG. 1A is a perspective, partially broken away view of the novel cap for closing the pH-reducing agent container;

DETAILED DESCRIPTION OF THE PREFERRED EMBODIMENT

Figure 1:
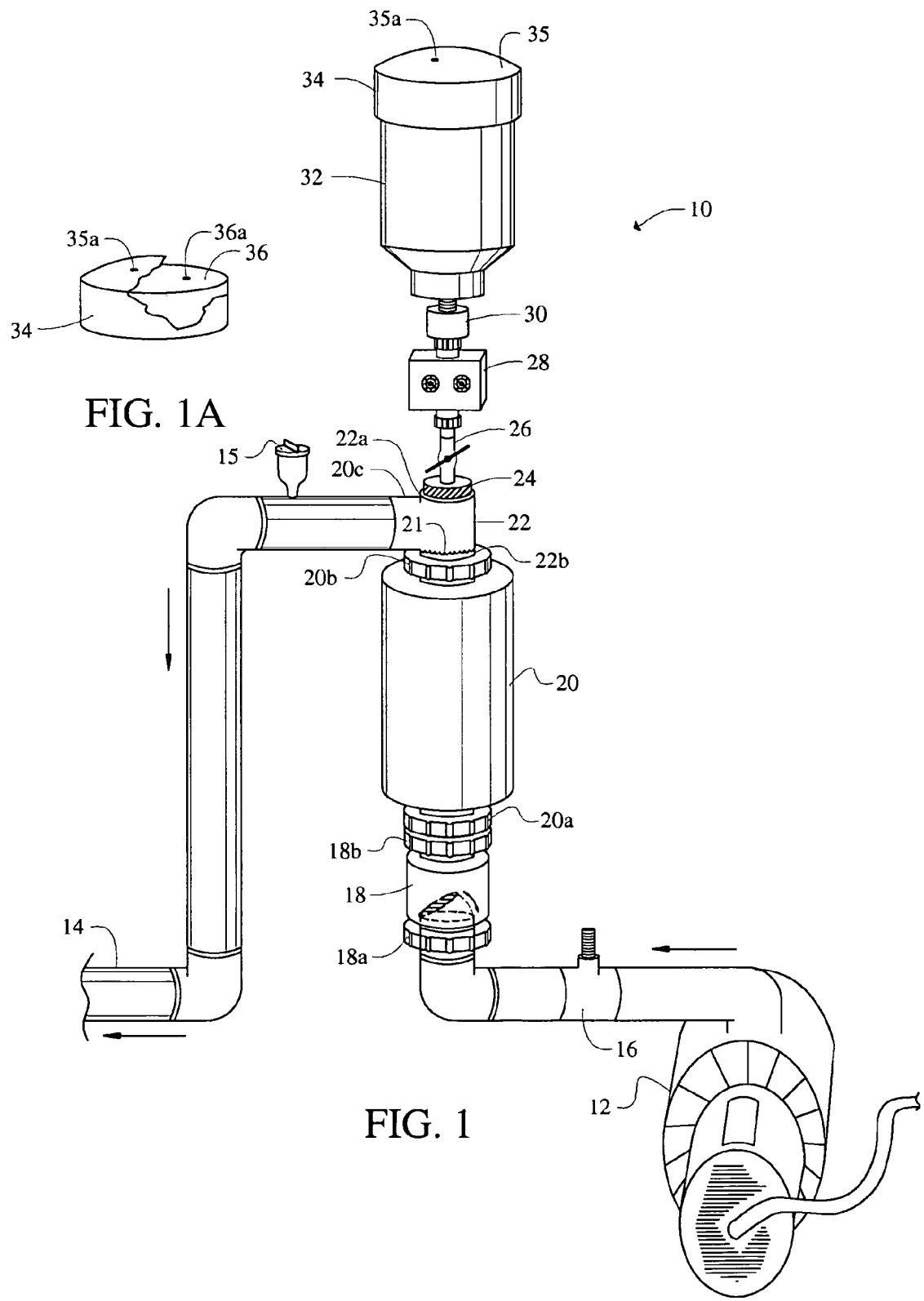
FIG. 1 is a diagrammatic view of a first embodiment of the invention.

Referring now to FIG. 1, it will there be seen that an illustrative embodiment of the invention is denoted as a whole by the reference numeral 10.

Novel chlorine generator and plate-cleaning assembly 10 is positioned in line between a circulation pump 12 and return line 14.

Circulation pump 12 draws water from a swimming pool, spa, fountain, well, or other main body of water, not shown, and pumps said water through flow switch 16, one-way check valve 18, electrolytic chamber 20, T-shaped conduit 22, and outlet 14. Electrolytic chamber 20 is vertically oriented.

Cap 24 screw-threadedly engages uppermost branch 22a of T-shaped conduit 22 and is adapted to screw-threadedly receive ball valve 26. Infusion means 28 surmounts said ball valve 26. Container or reservoir 32 surmounts said infusion means 28. Removable cap 34 provides a closure means for container 32.

Positioning reservoir 32 above electrolytic chamber 20 as depicted enables a pH-reducing agent in said reservoir to be gravity-fed into said chamber. However, this invention is not restricted to gravity-fed systems. Accordingly, reservoir 32 may be positioned at any elevation below said chamber 20 and a pump may be activated when addition of pH-reducing agent from said reservoir into said chamber is desired.

Water traveling from pump 12 to outlet 14 is therefore constrained to pass through electrolytic chamber 20. A plurality of electrolytic anode and cathode plates, not shown, is mounted within said chamber. Mineral deposits such as calcium may form on the electrodes as the chlorine generator operates in its regular, operatively-polarized mode.

Infusion means 28 includes a timer and a solenoid-controlled valve actuator that controls opening and closing of a normally closed valve. The timer controls the time of opening and closing of the valve and thus the time that the pH-reducing agent flows into chamber 20 from container 32.

One-way check valve 18 has no metal parts so that it is resistant to acidic solutions. It has unions or quick-release couplings 18a, 18b to facilitate its maintenance. One-way check valve 18 may be gravity-operated if it is mounted above the level of the body of water to which it is connected. Water flow thus keeps one-way check valve 18 open and gravity closes said valve 18 when such water flow stops. When closed, valve 18 prevents pH-reducing agent in electrolytic chamber 20 from flowing into circulation pump 12 and into the main body of water.

Valve 18 may be mounted below the level of the main body of water if it is a tension-type check valve and if "T"-shaped conduit 22 is positioned above the level of the body of water.

Electrolytic chamber 20 also has unions 20a, 20b at its opposite ends for enhancing maintenance.

Note in FIG. 1 that the reference numeral 21 denotes the water level when pump 12 is not operating. Any water above said water level 21 when circulation pump 12 is deactivated is drained off through outlet 14. Check valve 18 prevents water from draining towards pump 12 from electrolytic chamber 20 when said pump is not running. Thus, the smallest possible amount of water is isolated within electrolytic chamber 20.

"T"-shaped conduit 22 has three (3) legs 22a, 22b, and 22c. Leg 22a provides fluid communication with container 32 and thus enables infusion of the pH-reducing agent in said container into electrolytic chamber 20. Leg 22b provides fluid communication with electrolytic chamber 20 and defines high water mark 21. Leg 22c provides fluid communication with outlet conduit 14.

Vacuum breaker 15 is needed in some installations to enable water to drain back into the main body of water and to isolate the electrolytic cell.

In a preferred embodiment, the volume of electrolytic chamber 20 is minimized as much as possible without adversely affecting the flow rate and backpressure of the circulation system. Minimizing the volume of chamber 20 is advantageous because the reduction of the volume of water in the chamber minimizes the amount of pH-reducing agent required to reduce the pH of that water. It also minimizes the effect that the low pH water in the electrolytic chamber will have on the main body of water when circulation pump 12 is reactivated.

Ball valve 26 enables a user to control the flow rate of the pH-reducing agent into electrolytic chamber 20 but other less precise controls could be used instead of said ball valve. For example, in a proposed commercial embodiment of the invention, a pre-calibrated narrow opening could be employed. A small diameter solenoid valve could also be used to limit the flow rate. Moreover, a flexible and resilient hose could be used to control the flow of pH-reducing agent into chamber 20. A pinching device would pinch the hose to stop flow and would release the hose to start flow. A solenoid is preferred, however, because such a hose is likely to wear out faster than a solenoid.

Controlling the flow rate of pH-reducing agent into electrolytic chamber 20 is important because the pH-reducing agent must be added slowly enough to enable it to sink into and mix properly with the water in said chamber. If the pH-reducing agent is added too quickly, it can flow directly into the main body of water through return line 14 without performing its calcium-removing function.

In this first embodiment, infusion means 28 includes a timer and a normally-closed solenoid-actuated valve. The timer can open the valve only when circulation pump 12 is not running. The amount of time that the valve is open varies depending upon the strength of the pH-reducing agent used and the volume of water within chamber 20. The timer is calibrated to infuse at least the minimal amount of pH-reducing agent required to clean the chamber.

Flow switch 16 includes a flow-sensing means that generates an electrical signal that disables the timer and solenoid-actuated valve in infusion means 28 when circulation pump 12 is operating. The flow-sensing means generates an electrical signal that activates the timer and solenoid-actuated valve in infusion means 28 when circulation pump 12 is not operating.

The solenoid and valve mounted within infusion means housing 28 are preferably formed of a resistant polymer or other material that resists the corrosive effect of acidic agents and electrolysis.

Figure 2:
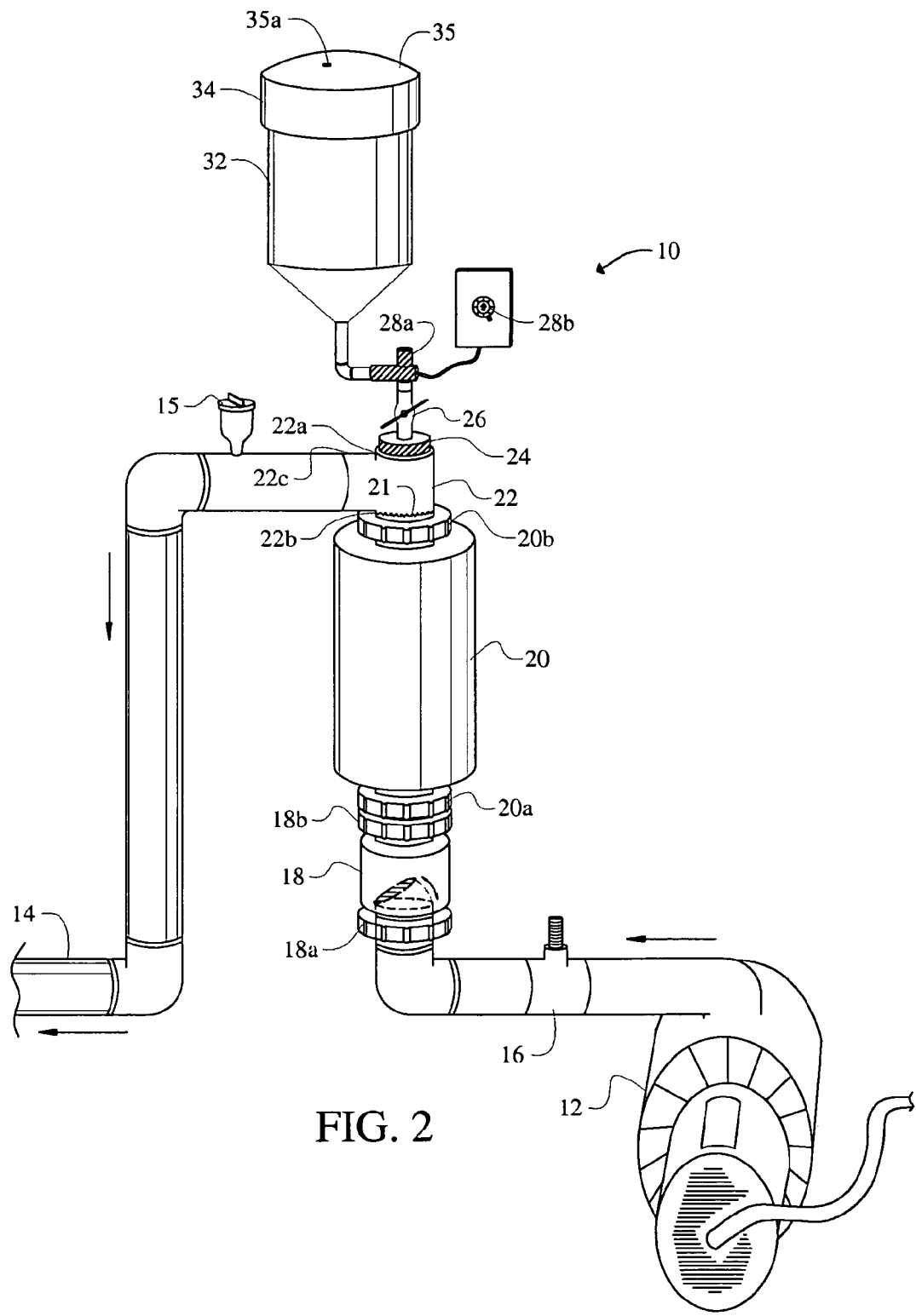
FIG. 2 is a diagrammatic view of a second embodiment.

In a variation of the first embodiment, depicted in FIG. 2, a solenoid-actuated valve is denoted 28a and a multi-function timer is denoted 28b. Thus, this variation differs from the first embodiment only to the extent that the timer and solenoid arrangement of the first embodiment are physically separated from one another so that multi-function timer 28b may be used to control the operation of other features of the circulation system such as the primary circulation pump, waterfalls, a second circulation pump dedicated to a spa, and the like.

Container 32 is preferably secured to a wall or other stable object by a strap joint or other suitable connection means.

Although the first embodiment, the variation thereof, and the second embodiment depict a gravity-fed system, another embodiment, not depicted, mounts container 32 below or level with electrolytic chamber 20. Such mounting requires the use of a peristaltic pump or equivalent pumping system. Although the addition of an extra pump adds expense to the system, there is a safety benefit to ground-level mounting of container 32 due to its hazardous contents.

As best understood in connection with FIG. 1A, cap 34 is preferably provided in the form of a two (2) layer cap. Pinhole 35a is formed in top or outer layer 35 and an offset pinhole 36a is formed in lower or inner layer 36. Pinholes 35a and 36a cooperate to prevent formation of a vacuum as pH-reducing agent flows out of container 32 into infusion means 28. Outer layer 35 helps suppress splashing of pH-reducing agent from container 32 if said container is dropped or bumped.

Figure 3:
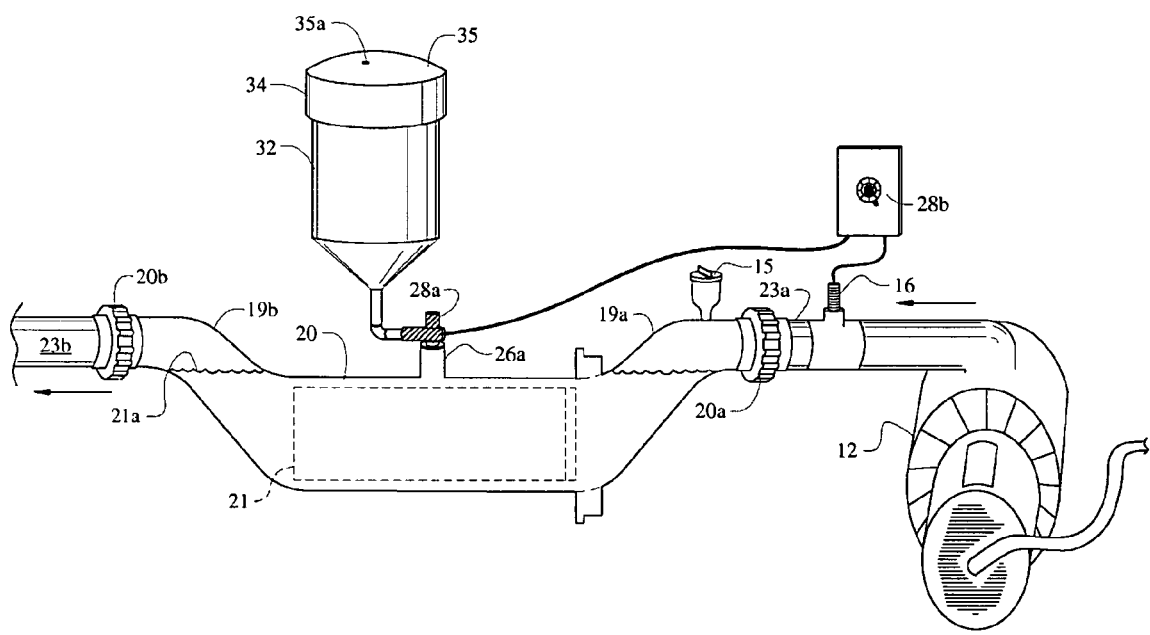
FIG. 3 is a diagrammatic view of a third embodiment.

In a third illustrated embodiment, depicted in FIG. 3, electrolytic chamber 20 is oriented in a horizontal disposition to eliminate the check valve of the first two depicted embodiments. Water is isolated in electrolytic cell 20 by means of a horizontally-disposed "U"-shaped trap. This eliminates the need for a check valve such as check valve 18 in the first and second embodiments. As in the other embodiments, the volume of water within the isolated cell chamber must be minimized so that cleaning may be accomplished with a minimum of pH reduction.

The "U"-shaped trap is formed by a pair of "S"-shaped conduits 19a, 19b that are joined by unions 20a, 20b, respectively, to inlet 23a and outlet 23b. Said conduits offset chamber 20 downwardly relative to said inlet and outlet so that water remains in said chamber 20 when circulation pump 12 is deactivated and water has drained from said inlet and outlet as depicted. Note that the water level after such draining is denoted 21a. The electrolytic plates in chamber 20 are denoted 21. Water level 21a is positioned slightly above the respective tops of said plates 21 to ensure immersion of said plates.

Drop-regulating chamber 26a is positioned downwardly of solenoid-activated valve 28a. An undepicted horizontal wall in chamber 26a has an undepicted pinhole formed therein of predetermined diameter through which the pH-reducing agent in container 32 passes, one drop at a time, to enter into electrolytic chamber 20. When circulation pump 12 shuts off, the water in the pipes drains to the pool or other main body of water, and air from vacuum breaker 15 passes by drop-regulating chamber 26a. Air therefore displaces the water within drop-regulating chamber 26a, thereby enabling drops of pH-reducing agent to be gravity fed into electrolytic cell 20.

The invention may also be understood to include the method steps performed by the apparatus disclosed herein. However, it should be understood that different apparatus may be used to perform the method steps, i.e., the invention is not limited to the specific apparatus and structure disclosed herein but is more broadly defined as a method of cleaning a chlorine generator.

More particularly, the steps of the novel method include providing an electrolytic chamber having an inlet and an outlet, pumping water from a main body of water through the electrolytic chamber, positioning electrodes within said electrolytic chamber, positioning a reservoir containing a pH-reducing agent in selective fluid communication with said electrolytic chamber, positioning an infusion means between the reservoir and the electrolytic chamber, controlling flow of the pH-reducing agent from the reservoir through the infusion means and into the electrolytic chamber so that the pH-reducing agent flows into said electrolytic chamber to clean mineral deposits from the electrolytic cell when said circulation pump is not operating, and preventing flow of the pH-reducing agent into the electrolytic chamber when the circulation pump is operating.

This method enables the system to operate properly without excessive reduction in pH in the main body of water. The critical aspects of the novel method include the provision of isolated water in a small chamber and a long dwell time so that a small amount of pH-reducing agent in said small chamber can dissolve deposits accumulated on the electrolytic plates.

The steps further include positioning a normally closed one-way valve and a valve actuator between a container holding a pH-reducing agent and an electrolytic chamber, adapting the valve actuator to open and close said normally closed one-way valve, generating and sending an "open" signal to the actuator means when the normally closed one-way valve is to be opened to release a pH-reducing agent from the container into the electrolytic chamber; and generating and sending a "close" signal to the actuator means when the normally closed one-way valve is to be closed.

The novel method further includes the steps of positioning a flow switch having a flow-sensing means between the circulation pump and the electrolytic chamber, adapting the flow-sensing means to generate and send a signal to said actuator means that prevents opening of said normally-closed one-way valve when said circulation pump is operating; and adapting the flow-sensing means to generate and send a signal to the actuator means that effects opening of the normally-closed one-way valve when the circulation pump is not operating.

Further steps include positioning a check valve, in a system where the electrolytic chamber is vertically mounted, between the circulation pump and the inlet of the electrolytic chamber, opening the check valve to allow flow of water from the main body of water into the electrolytic chamber when the circulation pump is operating, and closing the check valve to prevent flow of water from the electrolytic chamber to the main body of water when the circulation pump is not operating.

In systems where the electrolytic chamber is horizontally mounted, the step of providing a check valve is eliminated. The electrolytic chamber is positioned at the bottom of a "U"-shaped water trap so that the electrolytic plates are immersed in water. The inlet and outlet pipes in fluid communication with the electrolytic chamber are positioned to insure said immersion. Specifically, the respective bottom surfaces of said inlets and outlets and are positioned at or above the vertical elevation of the top of the electrodes within the chamber. The water trap electrolytic chamber is installed above the waterline of the main body of water to ensure that nearby water lines are drained and a small amount of water is isolated within the electrolytic chamber for cleansing purposes when the circulation pump turns off. Depending on the particular site, a vacuum breaker may be required to ensure proper drainage of water from the adjacent pipes.

The novel method requires that the water must be isolated in the electrolytic cell by means of a check valve (vertical electrolytic chamber), a "U"-shaped trap (horizontal electrolytic chamber), or the like, and the volume of water within the isolated cell chamber must be minimized so that cleaning may be accomplished with a minimum of pH reduction.

The method steps also include providing a timer adapted to generate and send an "open" signal to the actuator means at predetermined times and to send a "close" signal to the actuator means at predetermined times so that the normally closed valve is closed upon expiration of a predetermined amount of time. The circulation pump is deactivated when the timer sends the "open" and "closed" signals to the actuator means so that pH-reducing agent admitted into the electrolytic chamber dwells within the electrolytic chamber until the circulation pump is activated.

An alternative method eschews the timer and instead includes the steps of positioning a pH sensor in the main body of water, adapting the pH sensor to generate and send an "open" signal to the actuator means when the sensor detects that the pH of the main body of water is below a predetermined threshold so that the "open" signal causes the actuator means to open the normally closed one-way valve, and adapting the pH sensor to generate and send a "close" signal to the actuator means upon expiration of a predetermined amount of time so that the "close" signal causes the actuator means to close the normally closed one-way valve. This embodiment also includes deactivating the circulation pump when the signal generating means sends the "open" and "closed" signals to the actuator means so that pH-reducing agent admitted into the electrolytic chamber dwells within the electrolytic chamber until the circulation pump is activated so that the pH-reducing agent in the electrolytic chamber cleans mineral deposits from the anode and cathode when the circulation pump is not operating and so that the pH-reducing agent in the electrolytic chamber is introduced into the body of water when the circulation pump is activated.

In all embodiments, the method steps are performed overnight or during extended "off" periods to enable cleaning without over compensation of pH levels. The acid amount is calibrated depending on the size of the pool and the pH readings. If a cell has been cleaned within the previous ten (10) days, the novel system adjusts the pH without letting the acid remain in the cell for an extensive period of time (i.e., the system turns off the circulation pump, performs the acid infusion, and turns the circulation pump back "on" quickly). This process is repeated periodically until the proper pH level is achieved. When a chemical feed pump is used to infuse the pH-reducing agent, this pH adjustment may be performed when the circulation pump is operating.

In all embodiments, the method includes the steps of mounting the reservoir at a preselected elevation above the electrolytic chamber so that pH-reducing agent in the reservoir flows from the reservoir into the electrolytic chamber under influence of gravity when the normally closed one-way valve is open.

The method further includes the steps of forming the reservoir to have an open top, providing a closure means adapted to close the open top, providing the closure means with an inner lid and an outer lid disposed in vertically spaced apart relation to the inner lid, forming a first pinhole in the inner lid, and forming a second pinhole in the outer lid so that the first and second pinholes cooperate with one another to admit ambient air into the reservoir so that the pH-reducing agent may flow out of the reservoir when the normally closed one-way valve is open and so that the first and second pinholes are misaligned with respect to one another, thereby cooperating with one another to inhibit splashing of the pH-reducing agent from the reservoir when the reservoir is dropped or bumped.

Each pinhole has a one-way flap so that it admits air and keeps the pH-reducing agent in. Thus, the pH-reducing agent does not squirt out from the pinholes if the solenoid fails when in its "open" position and when the circulation pump is "on," thereby causing positive pressure buildup within the reservoir. Other vented splash-proof containers may also be used.

In a direct current system, only half of the center plates in the electrolytic cell need to be coated with a PGM because the coated plates will continuously remain anode. The other half of the center plates and the two outside plates will always remain cathode and will thus not require any coating. In a preferred embodiment, the coating is a ruthenium/iridium combination. Other combinations of PGMs may be used and a PGM may also be used alone. i.e., not in combination with any other PGM.

In traditional bipolar chambers, both sides of the plates must be coated. However, the present invention requires that only one side of each plate be coated because the electrical charge is delivered from only one end of the chamber.

The elimination of the need for reversing polarity also has the benefit of enabling the electrolytic chlorine generator to operate at low salt levels without increasing the requisite flow rate. Moreover, the novel system operates at low salt levels with only half the surface area of PGM-coated plates of a conventional electrolytic chlorinator operating at low salt levels. This saves salt and reduces the labor of the person charged with maintenance of the main body of water. This also reduces the initial cost of the system by reducing the amount of ruthenium or other PGM-coated plates when a system is purchased. It further eliminates the need for purchasing equipment to increase the water circulation speed.

The pH-reducing agent must dwell within the electrolytic chamber for a minimum amount of time, generally no less than four hours, mainly depending on the concentration of the pH-reducing agent. This allows ample time for the mineral deposits to be dissolved by the acid from the anode and cathode of the electrolytic chamber.

Advantageously, the novel system introduces the pH-reducing agent downstream of the circulation pump, filter, and other items of equipment that are not designed to handle aggressive chemicals. The electrolytic chamber into which the acid is introduced is specifically designed to handle hydrochloric acid and other pH-reducing agents. Significantly, the electrolytic chamber is the last item of equipment in the line before the treated water is returned to the body of water. No equipment is downstream of the electrolytic chamber. This protects all other items of equipment from the effects of the aggressive water containing the pH-reducing agent.

The automatic introduction of a pH-reducing agent into electrolytic chamber 20 has five (5) beneficial effects. First, the pH-reducing agent cleans mineral deposits such as calcium deposits from the electrolytic cells. Such cleaning is required only about once every two weeks. Second, when the circulation pump is re-started, the pH-reducing agent in the electrolytic chamber is pumped into the main body of water, thereby lowering the pH thereof. This is highly desirable due to the inherent pH-increasing effect of electrolytic chlorination. Third, the dissolved calcium is also returned to the main body of water when the circulation pump is reactivated so that there is no need to add calcium to the main body of water to maintain proper saturation balance. Fourth, the number of expensive, PGM-coated plates is reduced by more than half by eliminating or substantially reducing the need for cleaning the plates by reversing the polarity of the plates. The PGM-coated plates collectively are the single most expensive part of the entire electrolytic chlorinator system, so reducing the number of such plates required by more than fifty percent (50%) significantly reduces the cost of the system. Fifth, the strong self-cleaning characteristic of the present invention enables the narrowing of the spaces between the electrodes, thus enabling substantial lowering of the salinity of the main body of water.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A self-cleaning chlorine generator that forms a part of a circulation system for water in a main body of water, comprising: an electrolytic chamber; said electrolytic chamber having an inlet and an outlet; a circulation pump adapted to pump water from a main body of water to said inlet and through said electrolytic chamber; said outlet of said electrolytic chamber being in fluid communication with a return line that returns water to said main body of water; a control means for isolating the electrolytic chamber from water in said circulation system and in said main body of water; a plurality of electrolytic plates disposed within said electrolytic chamber comprising a plurality of anodes and a plurality of cathodes; a reservoir containing a pH-reducing agent disposed in selective fluid communication with said electrolytic chamber; an infusion means positioned between said reservoir and said electrolytic chamber; said control means controlling flow of said pH-reducing agent from said reservoir through said infusion means and into said electrolytic chamber; said control means adapted to enable said pH-reducing agent to flow into said electrolytic chamber to clean mineral deposits from said anode and cathode when said circulation pump is not operating; said control means adapted to prevent flow of said pH-reducing agent into said electrolytic chamber when said circulation pump is operating; said control means including a normally closed one-way valve and a valve actuator connected to said normally closed one-way valve; said valve actuator adapted to open and close said normally closed one-way valve; and said control means including a signal-generating means that generates and sends an "open" signal to said actuator means when said normally closed one-way valve is to be opened to release a pH-reducing agent from said reservoir into said electrolytic chamber; said control means including said signal-generating means that generates and sends a "close" signal to an actuator means when said normally closed one-way valve is to be closed; said control means comprising a pH sensor disposed in said body of water, said pH sensor including said signal-generating means adapted to generate and send said "open" signal to said actuator means when said sensor detects that the pH of said body of water is below a predetermined threshold, said "open" signal causing said actuator means to open said normally closed one-way valve; said signal-generating means also adapted to generate and send said "close" signal to said actuator means upon expiration of a predetermined amount of time, said "close" signal causing said actuator means to close said normally closed one-way valve; said circulation pump being in a deactivated state when said signal generating means sends said "open" and "closed" signals to said actuator means so that pH-reducing agent admitted into said electrolytic chamber dwells within said electrolytic chamber until said circulation pump is activated; whereby said pH-reducing agent in said electrolytic chamber cleans mineral deposits from said anode and cathode when said circulation pump is not operating; and whereby said pH-reducing agent in said electrolytic chamber is introduced into said body of water when said circulation pump is activated.

2. The self-cleaning chlorine-generator of claim 1, further comprising:
a flow switch positioned between said circulation pump and said electrolytic chamber;
a flow-sensing means positioned within said flow switch;
said flow-sensing means including a signal-generating means that generates and sends a signal to said actuator means that prevents opening of said normally-closed one-way valve when said circulation pump is operating; and
said flow-sensing means including a signal-generating means that generates and sends a signal to said actuator means that effects opening of said normally-closed one-way valve when said circulation pump is not operating.

3. The self-cleaning chlorine-generator of claim 1, further comprising:
said electrolytic chamber having a vertical orientation where said inlet is below said electrolytic chamber and said outlet is above said electrolytic chamber;
a check valve positioned between said circulation pump and said inlet of said electrolytic chamber;
said check valve being open to allow flow of water from said main body of water into said electrolytic chamber when said circulation pump is operating;
said check valve being closed to prevent flow of water from said electrolytic chamber to said main body of water when said circulation pump is not operating; and
a vacuum breaker disposed in said return line, downstream of said outlet of said electrolytic chamber, to enable water to drain back into said main body of water to ensure isolation of said electrolytic cell when said circulation pump is not operating.

4. The self-cleaning chlorine-generator of claim 1, further comprising:
said electrolytic chamber having a horizontal orientation;
said inlet and said outlet each having an "S"-shape and being horizontally disposed so that said electrolytic chamber is positioned at an elevation below a lowermost surface of said inlet and outlet to ensure that the electrolytic plates inside said electrolytic chamber are immersed in water even when all water in adjacent parts of the system has drained into the main body of water;
vacuum breaker disposed in said inlet, upstream of said outlet of said electrolytic chamber, to enable water to drain back into said main body of water to ensure isolation of said electrolytic cell when said circulation pump is not operating.

5. The self-cleaning chlorine generator of claim 1, further comprising:
said control means including a timer;
said timer adapted to generate and send an "open" signal to said actuator means at predetermined times;
said timer adapted to generate and send a "close" signal to said actuator means at predetermined times so that said normally closed valve is closed upon expiration of a predetermined amount of time;
said circulation pump being in a deactivated state when said timer sends said "open" and "closed" signals to said actuator means so that pH-reducing agent admitted into said electrolytic chamber dwells within said electrolytic chamber until said circulation pump is activated.

6. The self-cleaning chlorine generator of claim 1, further comprising:
said reservoir being mounted at a preselected elevation above said electrolytic chamber so that pH-reducing agent in said reservoir flows from said reservoir into said electrolytic chamber under influence of gravity when said normally closed one-way valve is open.

7. The self-cleaning chlorine generator of claim 1, further comprising:
said reservoir having an open top;
a closure means adapted to close said open top;
said closure means having an inner lid and an outer lid disposed invertically spaced apart relation to said inner lid;
a first pinhole formed in said inner lid, said first pinhole having a one-way flap;
a second pinhole formed in said outer lid, said second pinhole having a one-way flap;
said first and second pinholes cooperating with one another to admit ambient air into said reservoir so that said pH-reducing agent may flow out of said reservoir when said normally closed one-way valve is open;
said first and second pinholes being misaligned with respect to one another, thereby cooperating with one another to inhibit splashing of said pH-reducing agent from said reservoir when said reservoir is dropped or bumped.

8. The self-cleaning chlorine generator of claim 1, further comprising:
said pH-reducing agent being hydrochloric acid.

* * * * *